United States Patent
Kang et al.

(10) Patent No.: US 9,273,171 B2
(45) Date of Patent: Mar. 1, 2016

(54) FLAME RETARDANT THERMOPLASTIC COPOLYMER, METHOD FOR PREPARING THE SAME, AND MOLDED ARTICLE INCLUDING THE SAME

(71) Applicant: Cheil Industries Inc., Gumi-si (KR)

(72) Inventors: Yong Hee Kang, Uiwang-si (KR); Man Suk Kim, Uiwang-si (KR); Hwan Sung Cheon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 21 days.

(21) Appl. No.: 14/224,530

(22) Filed: Mar. 25, 2014

(65) Prior Publication Data

US 2015/0005410 A1    Jan. 1, 2015

(30) Foreign Application Priority Data

Jun. 27, 2013    (KR) .................. 10-2013-0074952

(51) Int. Cl.
| | | |
|---|---|---|
| C08G 79/04 | (2006.01) | |
| C08G 79/02 | (2006.01) | |
| C08F 212/10 | (2006.01) | |
| C08F 230/02 | (2006.01) | |
| C08L 25/12 | (2006.01) | |

(52) U.S. Cl.
CPC ............. *C08F 212/10* (2013.01); *C08F 230/02* (2013.01)

(58) Field of Classification Search
CPC .............................. C08G 79/02; C08G 79/04
USPC ........... 528/398; 523/122; 526/275; 524/547, 524/850; 264/239
See application file for complete search history.

(56) References Cited

U.S. PATENT DOCUMENTS

| | | |
|---|---|---|
| 3,725,509 A | 4/1973 | Kraft et al. |
| 4,014,836 A | 3/1977 | Kraft et al. |
| 4,035,571 A | 7/1977 | Brunner et al. |
| 4,444,969 A | 4/1984 | Younes |
| 4,571,418 A | 2/1986 | Younes |
| 8,846,789 B2 | 9/2014 | Kim et al. |

FOREIGN PATENT DOCUMENTS

| | | |
|---|---|---|
| KR | 2009-0084785 A | 8/2009 |
| KR | 2010-0080338 A | 7/2010 |

OTHER PUBLICATIONS

Office Action in counterpart Korean Application No. 10-2013-0074952 dated Sep. 24, 2015, pp. 1-6.

*Primary Examiner* — Duc Truong
(74) *Attorney, Agent, or Firm* — Additon, Higgins & Pendleton, P.A.

(57) ABSTRACT

Disclosed herein are a thermoplastic copolymer, which is a polymer of a monomer mixture including: a phosphorus (meth)acrylic monomer represented by Formula 1; an aromatic vinyl monomer; and a vinyl cyanide monomer. The thermoplastic copolymer can exhibit excellent flame retardancy with minimal or no deterioration in heat resistance, and is eco-friendly.

[Formula 1]

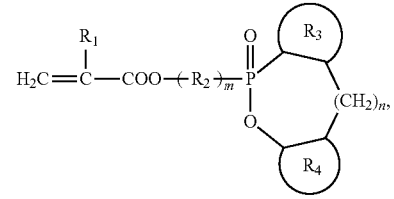

wherein $R_1$ is hydrogen or methyl; $R_2$ is a substituted or unsubstituted $C_1$ to $C_{20}$ hydrocarbon group; $R_3$ and $R_4$ are each independently a substituted or unsubstituted $C_6$ to $C_{20}$ cyclic hydrocarbon group; m is an integer from 1 to 10; and n is an integer from 0 to 5.

12 Claims, No Drawings

FLAME RETARDANT THERMOPLASTIC COPOLYMER, METHOD FOR PREPARING THE SAME, AND MOLDED ARTICLE INCLUDING THE SAME

CROSS-REFERENCE TO RELATED APPLICATION

This application claims priority under 35 USC Section 119 to and the benefit of Korean Patent Application No. 10-2013-0074952, filed Jun. 27, 2013, the entire disclosure of which is incorporated herein by reference.

FIELD OF THE INVENTION

The present invention relates to a flame retardant thermoplastic copolymer, a method for preparing the same, and a molded article including the same. More particularly, the present invention relates to a thermoplastic copolymer, which includes aromatic vinyl, vinyl cyanide and phosphorus (meth)acrylic monomers to provide excellent flame retardancy, a method for preparing the same, and a molded article including the same.

BACKGROUND OF THE INVENTION

Thermoplastic resins exhibit excellent physical properties, such as low specific gravity, good moldability, and good impact resistance, as compared with glass or metal. Recently, with the trend of producing low cost, larger and lighter weight electronics, plastic products made of thermoplastic resins are quickly replacing existing glass or metal-based products, thereby broadening application ranges of the thermoplastic resins to fields from electronics to automobile components.

To impart flame retardancy to the thermoplastic resins, a method of blending antimony, halogen, phosphorus compounds, or compounds containing nitrogen as a flame retardant is widely known. Among such flame retardants, when a halogen flame retardant is used, there are drawbacks in that the halogen flame retardant causes corrosion of a processing apparatus due to corrosive gases generated therefrom during processes, and generates toxic gases such as dioxin, hydrogen halide gases and the like during burning. Thus, demand for resins free from halogen flame retardants is increasing.

The most general technique for imparting flame retardancy without use of the halogen flame retardants is use of phosphorus flame retardants. However, although phosphorus flame retardants are superior to the halogen flame retardants in terms of suppression of corrosive gases and toxic gases, phosphorus flame retardants exhibit lower flame retardancy than halogen flame retardants and have a drawback in that polymeric resins capable of acting as a flame retardant are limited to resins containing polycarbonate and polyphenylene ether. In addition, a higher amount of a phosphoric acid ester flame retardant causes deterioration in heat resistance of a resin composition. Further, the phosphoric acid ester flame retardant has problems in that a molded article suffers from a juicing phenomenon causing the phosphoric acid ester flame retardant to move to a surface of the molded article, or in that an injection-molded article suffers from black points and black lines on a surface thereof due to decomposition of the flame retardant, and deteriorates mechanical strength, such as impact strength, flexural strength, flexural modulus, and the like.

To resolve such problems, a method of introducing a flame retardant into a polymer chain has been proposed. For example, U.S. Pat. Nos. 3,725,509 and 4,014,836 disclose use of a copolymer of a halogen-containing unsaturated monomer and bis(hydrocarbyl)vinyl phosphonate as a flame retardant additive, and U.S. Pat. Nos. 4,444,969 and 4,571,418 disclose flame retardant copolymers prepared by copolymerization of an aromatic vinyl monomer, bis(hydrocarbyl)vinyl phosphonate, and an imide derivative of unsaturated anhydride. In addition, U.S. Pat. No. 4,035,571 discloses a flame retardant copolymer prepared by copolymerization of an unsaturated monomer, bis(hydrocarbyl)vinyl phosphonate, and acrylic or methacrylic acid.

However, such methods and copolymers have drawbacks in that a large amount of bis(hydrocarbyl)vinyl phosphonate must be introduced to secure sufficient flame retardancy, thereby extremely limiting use of the copolymers due to deterioration in heat resistance and mechanical properties.

Therefore, there is a need for a novel flame retardant thermoplastic copolymer, which can prevent deterioration in heat resistance caused by simple addition of a phosphorus flame retardant, and impart flame retardancy.

SUMMARY OF THE INVENTION

Embodiments of the present invention provide a thermoplastic copolymer which includes aromatic vinyl, vinyl cyanide and phosphorus (meth)acrylic monomers to provide excellent flame retardancy with minimal or no deterioration in heat resistance and is eco-friendly, a method for preparing the same, and a molded article including the same.

The thermoplastic copolymer is a polymer of a monomer mixture including a phosphorus (meth)acrylic monomer represented by Formula 1, an aromatic vinyl monomer, and a vinyl cyanide monomer.

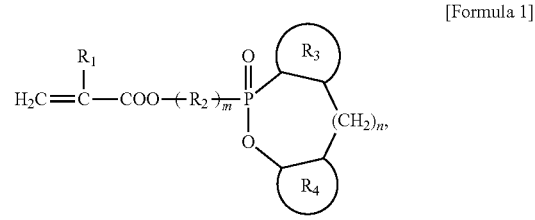

[Formula 1]

wherein $R_1$ is hydrogen or methyl; $R_2$ is a substituted or unsubstituted $C_1$ to $C_{20}$ hydrocarbon group; $R_3$ and $R_4$ are the same or different and are each independently a substituted or unsubstituted $C_6$ to $C_{20}$ cyclic hydrocarbon group; m is an integer from 1 to 10; and n is an integer from 0 to 5.

In one embodiment, the phosphorus (meth)acrylic monomer may be present in an amount of about 1% by weight (wt %) to about 70 wt %, and the monomers including the aromatic vinyl monomer and the vinyl cyanide monomer may be present in an amount of about 30 wt % to about 99 wt %.

In one embodiment, the monomer mixture may have a molar ratio of the aromatic vinyl monomer to the vinyl cyanide monomer from about 6:about 4 to about 9:about 1.

In one embodiment, the aromatic vinyl monomer may include at least one of styrene, alkyl group-substituted styrene, vinylnaphthalene, α-methylstyrene, β-methylstyrene, alkyl group-substituted α-methylstyrene, tert-butylstyrene, halogenated styrene, alkoxystyrene, acetoxystyrene, hydroxystyrene, α-carboxystyrene, and/or α-alkoxystyrene.

In one embodiment, the vinyl cyanide monomer may include at least one of acrylonitrile, methacrylonitrile, and/or ethacrylonitrile.

In one embodiment, the thermoplastic copolymer may have a weight average molecular weight from about 5,000 g/mol to about 500,000 g/mol.

In one embodiment, the thermoplastic copolymer may have a flame retardancy level of V2 or higher, as measured on a 3.2 mm thick specimen according to the UL94 vertical flammability test method.

In one embodiment, the thermoplastic copolymer may further include at least one additive selected from flame retardants, surfactants, nucleating agents, coupling agents, fillers, plasticizers, impact modifiers, lubricants, antibacterial agents, release agents, heat stabilizers, antioxidants, photostabilizers, compatibilizers, inorganic additives, antistatic agents, pigments, and/or dyes in addition to the monomer mixture.

The present invention also provides a method for preparing a thermoplastic copolymer. The method includes performing polymerization by introducing a polymerization initiator to the monomer mixture including the phosphorus (meth)acrylic monomer represented by Formula 1, the aromatic vinyl monomer and the vinyl cyanide monomer.

In one embodiment, the polymerization initiator may be a radical polymerization initiator.

In one embodiment, the thermoplastic copolymer may be polymerized by further introducing at least one additive selected from flame retardants, surfactants, nucleating agents, coupling agents, fillers, plasticizers, impact modifiers, lubricants, antibacterial agents, release agents, heat stabilizers, antioxidants, photostabilizers, compatibilizers, inorganic additives, antistatic agents, pigments, and/or dyes.

The present invention further relates to a molded article. The molded article is produced from the thermoplastic copolymer.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with exemplary embodiments of the present invention, a thermoplastic copolymer is a polymer (terpolymer) of a monomer mixture, which includes a phosphorus (meth)acrylic monomer represented by Formula 1, an aromatic vinyl monomer, and a vinyl cyanide monomer.

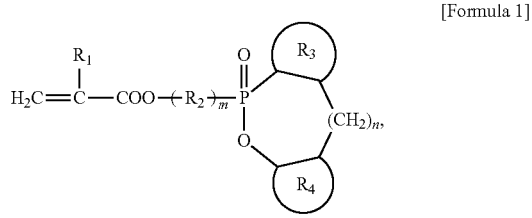

[Formula 1]

wherein $R_1$ is hydrogen or methyl; $R_2$ is a substituted or unsubstituted $C_1$ to $C_{20}$ hydrocarbon group, for example, a substituted or unsubstituted $C_1$ to $C_{20}$ linear alkylene group, $C_4$ to $C_{20}$ branched alkylene group, $C_5$ to $C_{20}$ cyclic alkylene group and/or a substituted or unsubstituted $C_6$ to $C_{20}$ arylene group, and as another example a substituted or unsubstituted $C_1$ to $C_{10}$ linear alkylene group, $C_4$ to $C_{10}$ branched alkylene group, $C_5$ to $C_{10}$ cyclic alkylene group and/or a substituted or unsubstituted $C_6$ to $C_{10}$ arylene group, and as yet another example a $C_1$ to $C_4$ linear alkylene group; $R_3$ and $R_4$ are the same or different and are each independently a substituted or unsubstituted $C_6$ to $C_{20}$ cyclic hydrocarbon group, for example, a substituted or unsubstituted $C_6$ to $C_{20}$ cycloalkyl and/or $C_6$ to $C_{20}$ aryl group, and as another example a substituted or unsubstituted $C_6$ to $C_{10}$ aryl group; m is an integer from 1 to 10; and n is an integer from 0 to 5. Herein, when n is 0, there is a single bond, and the phosphorus-containing heterocyclic group forms a hexagonal ring in this case.

Unless otherwise stated, the term "(meth)acrylic" as used herein may refer to both "acrylic" and "methacrylic." For example, "(meth)acrylate" may refer to both "acrylate" and "methacrylate." In addition, as used herein, the term "hydrocarbon group" refers to a $C_1$ to $C_{20}$ linear, $C_4$ to $C_{20}$ branched, or $C_5$ to $C_{20}$ cyclic saturated or unsaturated hydrocarbon group, the term "substituted" means that a hydrogen atom of a compound is substituted with a substituent including halogen atoms (F, Cl, Br and I), hydroxyl groups, nitro groups, cyano groups, amino groups, azido groups, amidino groups, hydrazine groups, hydrazono groups, carbonyl groups, carbamyl groups, thiol groups, ester groups, carboxyl groups or salts thereof, sulfonic acid groups or salts thereof, phosphoric acid groups or salts thereof, $C_1$ to $C_{20}$ alkyl groups, $C_2$ to $C_{20}$ alkenyl groups, $C_2$ to $C_{20}$ alkynyl groups, $C_1$ to $C_{20}$ alkoxy groups, $C_6$ to $C_{30}$ aryl groups, $C_6$ to $C_{30}$ aryloxy groups, $C_3$ to $C_{30}$ cycloalkyl groups, $C_3$ to $C_{30}$ cycloalkenyl groups, $C_3$ to $C_{30}$ cycloalkynyl groups, and combinations thereof.

One example of the phosphorus (meth)acrylic monomer may include 9,10-dihydro-9-oxa-10-phosphaphenanthrene-10-oxy methyl (meth)acrylate, without being limited thereto. Phosphorus (meth)acrylic monomers useful in the invention can be readily made by the skilled artisan without undue experimentation and/or are commercially available.

The copolymer may include the phosphorus (meth)acrylic monomer in an amount of about 1 wt % to about 70 wt %, for example, about 5 wt % to about 50 wt %, based on the total weight or amount (100 wt %) of monomers. In some embodiments, the copolymer may include the phosphorus (meth)acrylic monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the phosphorus (meth)acrylic monomer can be in a range from about any of the foregoing amounts to about any other of the foregoing amounts.

When the copolymer includes the phosphorus (meth)acrylic monomer in an amount within this range, the thermoplastic copolymer can have excellent flame retardancy with minimal or no deterioration in properties, such as heat resistance, and the like.

Examples of the aromatic vinyl monomer may include without limitation styrene, alkyl group-substituted styrene, vinylnaphthalene, α-methylstyrene, β-methylstyrene, alkyl group-substituted α-methylstyrene, tert-butylstyrene, halogenated styrene, alkoxystyrene, acetoxystyrene, hydroxystyrene, α-carboxystyrene, α-alkoxystyrene, and the like, and mixtures thereof. In exemplary embodiments, the aromatic vinyl monomer may include styrene.

Examples of the vinyl cyanide monomer may include without limitation acrylonitrile, methacrylonitrile, ethacrylonitrile, and the like, and mixtures thereof. In exemplary embodiments, the vinyl cyanide monomer may include acrylonitrile.

The copolymer may include the monomers including the aromatic vinyl monomer and the vinyl cyanide monomer in an amount of about 30 wt % to about 99 wt %, for example, about 50 wt % to about 95 wt %, based on the total weight or amount (100 wt %) of monomers. In some embodiments, the copolymer may include the monomers including the aromatic vinyl monomer and the vinyl cyanide monomer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the monomers including the aromatic vinyl monomer and the vinyl cyanide monomer can be in a range from about any of the foregoing amounts to about any other of the foregoing amounts.

When the copolymer includes the monomers including the aromatic vinyl monomer and the vinyl cyanide monomer in an amount within this range, the thermoplastic copolymer can have excellent flame retardancy with minimal or no deterioration in properties, such as heat resistance, and the like.

In one embodiment, the monomer mixture may have a weight ratio of the aromatic vinyl monomer to the vinyl cyanide monomer from about 6:about 4 to about 9:about 1, for example, from about 7:about 3 to about 8:about 2. Within this range, the thermoplastic copolymer can have excellent flame retardancy with minimal or no deterioration in properties, such as heat resistance, and the like.

In addition, the (meth)acrylic copolymer according to the invention may further include one or more additives. Examples of the additives can include without limitation flame retardants, surfactants, nucleating agents, coupling agents, fillers, plasticizers, impact modifiers, lubricants, antibacterial agents, release agents, heat stabilizers, antioxidants, photostabilizers, compatibilizers, inorganic additives, antistatic agents, pigments, dyes, and the like, and mixtures thereof, as needed. Although the additives may be added to the copolymer in a process of polymerization or pelletization (extrusion, and the like), an addition method and an added amount of the additives are not limited.

Examples of the antioxidant may include without limitation octadecyl 3-(3,5-tert-butyl-4-hydrophenyl)propionate, triethylene glycol-bis-3(3-di-tert-butyl-4-hydroxy-5-methylphenyl)propionate, 2,6-di-tert-butyl-4-methyl phenol, 2,2'-methylenebis(4-methyl-6-tert-butyl phenol), tri(2,4-di-tert-butylphenyl)phosphite, n-octadecyl-3(3,5-di-tert-butyl-4-hydroxyphenyl)propionate, 1,3,5-tris(3,5-di-tert-butyl-4-hydroxybenzyl)isocyanurate, pentaerythritol tetrakis(3-(3,5-di-tert-butyl-4-hydroxyphenyl)propionate), distearyl thiodipropionate, dilauryl thiodipropionate, di-phenyl-isooctylphosphite, and the like, and mixtures thereof.

According to the invention, the thermoplastic copolymer may have a weight average molecular weight from about 5,000 g/mol to about 500,000 g/mol, for example, from about 10,000 g/mol to about 300,000 g/mol. Within this range, the thermoplastic copolymer can exhibit excellent heat resistance and flame retardancy.

The thermoplastic copolymer may have a flame retardancy level of V2 or higher, for example, from V2 to V0, as measured on a 3.2 mm thick specimen according to the UL94 vertical flammability test method.

In addition, the thermoplastic copolymer may have a glass transition temperature (Tg) from about 105° C. to about 130° C., for example, from about 110° C. to about 125° C. Within this range, the thermoplastic copolymer can exhibit excellent heat resistance.

According to the invention, the thermoplastic copolymer may be prepared by a typical polymerization method known in the art, such as bulk polymerization, solution polymerization, and the like. For example, the thermoplastic copolymer may be prepared through a method including performing polymerization by adding a polymerization initiator to the monomer mixture.

In one embodiment, the polymerization initiator may be a typical radical polymerization initiator known in the art. Examples of the polymerization initiator may include without limitation octanoyl peroxide, decanoyl peroxide, lauroyl peroxide, benzoyl peroxide (BPO), dicumyl peroxide (DCP), monochlorobenzoyl peroxide, dichlorobenzoyl peroxide, p-methylbenzoyl peroxide, di-tert-butyl peroxide (DTBP), azobisisobutyronitrile (AIBN), and azobis-(2,4-dimethyl)-valeronitrile. These may be used alone or in combination thereof. The polymerization initiator may be present in an amount of about 0.01 parts by weight to about 10 parts by weight, for example, about 0.05 parts by weight to about 5 parts by weight, based on about 100 parts by weight of the monomers.

In one embodiment, when solution polymerization is used, examples of a solvent used in the solution polymerization may include without limitation aromatic, ketone and/or ether compounds, such as benzene, toluene, ethylbenzene, xylene, tetrahydrofuran, methylethylketone (MEK), and the like, and mixtures thereof. The solvent may be present in an amount of about 5 parts by weight to about 200 parts by weight, for example, about 10 parts by weight to about 100 parts by weight, based on about 100 parts by weight of the monomers, without being limited thereto.

In addition, to adjust molecular weight of the copolymer, about 0.1 parts by weight to about 2 parts by weight of a molecular weight regulator, such as n-octyl mercaptan and the like, may be added based on about 100 parts by weight of the monomers upon polymerization.

In the method for preparing the thermoplastic copolymer according to the invention, temperature and time for polymerization may be appropriately adjusted upon polymerization. For example, polymerization may be performed at a temperature from about 70° C. to about 120° C. for about 2 hours to about 12 hours. Polymerization is completed, followed by cooling, washing, dehydration and drying, thereby obtaining the thermoplastic copolymer in particle form.

The thermoplastic copolymer may replace existing thermoplastic resins, such as acrylic resins, styrene resins, and the like. For example, the thermoplastic copolymer may be used alone, or be used by blending the thermoplastic copolymer with other resins (for example, about 99 wt % or less), such as polycarbonate and the like, for further improvement of flame retardancy thereof.

According to the invention, the thermoplastic copolymer alone or as part of a resin composition may form a molded article. Molding methods for preparing the molded article may include without limitation extrusion, injection, casting, and the like. The molding methods are widely known to those skilled in the art. For example, after the thermoplastic copolymer can be mixed with the additives as needed, the mixture may be prepared into pellets through melt extrusion in an extruder, and various injection and extrusion molded articles may be prepared using the pellets. The molded article according to the invention can exhibit excellent flame retardancy and heat resistance, and thus can be particularly useful for electric/electronic products, automobile components, and the like.

Hereinafter, the present invention will be described in more detail with reference to the following examples. However, it should be noted that these examples are provided for illustration only and are not to be construed in any way as limiting the present invention.

EXAMPLES

Example 1

In a reactor, 10 g of 9,10-dihydro-9-oxa-10-phosphaphenanthrene-10-oxy methyl methacrylate as a phosphorus (meth)acrylic monomer, 80 g of styrene and 20 g of acrylonitrile are placed, followed by slow and dropwise addition of 700 g of methylethylketone (MEK). Next, 3.5 g of azobisisobutyronitrile (AIBN) is added to the reactor, followed by stirring the components at 90° C. for 6 hours. Next, the reaction solution is cooled to room temperature and then diluted with 1 kg of methylethylketone, followed by slow and dropwise addition of the diluted reaction solution to 10 L of hexane, which is being slowly stirred, thereby precipitating solids. The solids are filtered, followed by drying in a vacuum oven (50° C., 10 mmHg) for 12 hours, thereby preparing a thermoplastic copolymer represented by Formula 2 (in Formula 2, x, y and z are parts by weight, and x=68.18, y=22.72 and z=9.09) (yield: 85%).

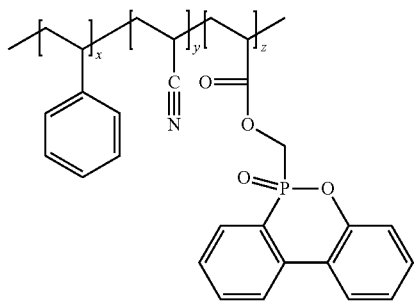

[Formula 2]

Example 2

A thermoplastic copolymer represented by Formula 2 is prepared in the same manner as in Example 1 except that 20 g of the 9,10-dihydro-9-oxa-10-phosphaphenanthrene-10-oxy methyl methacrylate is used (in Formula 2, x, y and z are parts by weight, and x=62.50, y=20.83 and z=16.67) (yield: 96%).

Example 3

A thermoplastic copolymer represented by Formula 2 is prepared in the same manner as in Example 1 except that 20 g of the 9,10-dihydro-9-oxa-10-phosphaphenanthrene-10-oxy methyl methacrylate is used (in Formula 2, x, y and z are parts by weight, and x=50.00, y=16.66 and z=33.34) (yield: 95%).

Comparative Example 1

A thermoplastic copolymer (SAN) is prepared in the same manner as in Example 1 except that the phosphorus (meth)acrylic monomer is not used (yield: 95%).

Comparative Example 2

A thermoplastic copolymer is prepared in the same manner as in Example 1 except that a phosphorus methacrylic monomer represented by Formula 3 is used instead of the above phosphorus (meth)acrylic monomer (yield: 95%).

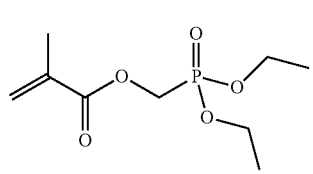

[Formula 3]

Preparation of Specimen 0.1 parts by weight of a hindered phenol heat stabilizer is added to 100 parts by weight of each of the thermoplastic copolymers of Examples 1 to 3 and Comparative Examples 1 to 2, followed by melting, kneading and extrusion, thereby preparing pellets. Here, extrusion is performed using a twin-screw extruder having L/D=29 and a diameter of 45 mm. The prepared pellets are dried at 80° C. for 6 hours, followed by injection molding using a 6 oz injection machine, thereby preparing a specimen.

Evaluation of Properties (1) Weight average molecular weight (Mw): Weight average molecular weight is measured using Gel Permeation Chromatography (GPC).

(2) Flame retardancy: After preparation of a 3.2 mm thick specimen, flame retardancy is measured on the specimen according to the UL94 vertical flammability test method.

(3) Heat resistance (Glass transition temperature (Tg)): Glass transition temperature is measured on the prepared specimen using a Different Scanning calorimeter (DSC). The DSC is a Q20 (TA Instruments). Measurement is performed in a nitrogen atmosphere under conditions of a heating rate of 10° C./min and a cooling rate of 10° C./min in a temperature range from 30° C. to 400° C. Here, the glass transition temperature is determined as a temperature measured upon second heating (unit: ° C.).

TABLE 1

|  | Example 1 | Example 2 | Example 3 | Comparative Example 1 | Comparative Example 2 |
|---|---|---|---|---|---|
| Weight average molecular weight (g/mol) | 179,000 | 105,000 | 267,000 | 173,000 | 223,000 |
| Glass transition temperature (° C.) | 110 | 110 | 123 | 105 | 93 |
| Flame retardancy | V-1 | V-0 | V-0 | Fail | V-1 |

From the results of Table 1, it can be seen that the thermoplastic copolymers (Examples 1 to 3) using the phosphorus (meth)acrylic monomer having a structure represented by Formula 1 exhibit excellent flame retardancy without deterioration in heat resistance.

Conversely, it can be seen that the thermoplastic copolymer of Comparative Example 1 free from phosphorus (meth) acrylic monomers could not secure flame retardancy and that, although the thermoplastic copolymer of Comparative Example 2 including a typical phosphonate group instead of the phosphorus (meth)acrylic monomer according to the invention could secure flame retardancy, the thermoplastic copolymer of Comparative Example 2 exhibits deteriorated heat resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A thermoplastic copolymer, which is a polymer of a monomer mixture comprising: a phosphorus (meth)acrylic monomer represented by Formula 1; an aromatic vinyl monomer; and a vinyl cyanide monomer:

[Formula 1]

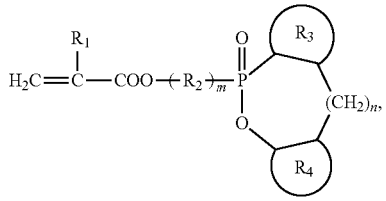

wherein $R_1$ is hydrogen or methyl; $R_2$ is a substituted or unsubstituted $C_1$ to $C_{20}$ hydrocarbon group; $R_3$ and $R_4$ are the same or different and are each independently a substituted or unsubstituted $C_6$ to $C_{20}$ cyclic hydrocarbon group; m is an integer from 1 to 10; and n is an integer from 0 to 5.

2. The thermoplastic copolymer according to claim 1, wherein the phosphorus (meth)acrylic monomer is present in an amount of about 1 wt % to about 70 wt %, and the monomers comprising the aromatic vinyl monomer and the vinyl cyanide monomer are present in an amount of about 30 wt % to about 99 wt %.

3. The thermoplastic copolymer according to claim 1, wherein the monomer mixture has a molar ratio of the aromatic vinyl monomer to the vinyl cyanide monomer from about 6:about 4 to about 9:about 1.

4. The thermoplastic copolymer according to claim 1, wherein the aromatic vinyl monomer comprises styrene, alkyl group-substituted styrene, vinylnaphthalene, α-methylstyrene, β-methylstyrene, alkyl group-substituted α-methylstyrene, tert-butylstyrene, halogenated styrene, alkoxystyrene, acetoxystyrene, hydroxystyrene, α-carboxystyrene, α-alkoxystyrene, or a mixture thereof.

5. The thermoplastic copolymer according to claim 1, wherein the vinyl cyanide monomer comprises acrylonitrile, methacrylonitrile, ethacrylonitrile, or a mixture thereof.

6. The thermoplastic copolymer according to claim 1, wherein the thermoplastic copolymer has a weight average molecular weight from about 5,000 g/mol to about 500,000 g/mol.

7. The thermoplastic copolymer according to claim 1, wherein the thermoplastic copolymer has a flame retardancy level of V2 or higher, as measured on a 3.2 mm thick specimen according to the UL94 vertical flammability test method.

8. The thermoplastic copolymer according to claim 1, further comprising at least one of a flame retardant, surfactant, nucleating agent, coupling agent, filler, plasticizer, impact modifier, lubricant, antibacterial agent, release agent, heat stabilizer, antioxidant, photostabilizer, compatibilizer, inorganic additive, antistatic agent, pigment, dye or a mixture thereof.

9. A method for preparing a thermoplastic copolymer comprising:
performing polymerization by introducing a polymerization initiator to a monomer mixture comprising a phosphorus (meth)acrylic monomer represented by Formula 1, an aromatic vinyl monomer, and a vinyl cyanide monomer:

[Formula 1]

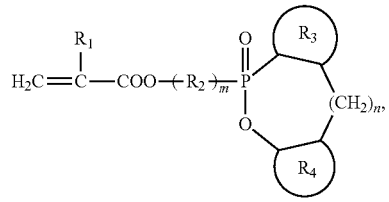

wherein $R_1$ is hydrogen or methyl; $R_2$ is a substituted or unsubstituted $C_1$ to $C_{20}$ hydrocarbon group; $R_3$ and $R_4$ are the same or different and are each independently a substituted or unsubstituted $C_6$ to $C_{20}$ cyclic hydrocarbon group; m is an integer from 1 to 10; and n is an integer from 0 to 5.

10. The method according to claim 9, wherein the polymerization initiator is a radical polymerization initiator.

11. The method according to claim 9, wherein polymerization is performed by further introducing at least one additive comprising a flame retardant, surfactant, nucleating agent, coupling agent, filler, plasticizer, impact modifier, lubricant, antibacterial agent, release agent, heat stabilizer, antioxidant, photostabilizer, compatibilizer, inorganic additive, antistatic agent, pigment, dye or a mixture thereof to the monomer mixture.

12. A molded article produced from the thermoplastic copolymer according to claim 1.

* * * * *